March 22, 1938.  E. E. FISHER  2,111,910
SANDWICH CUTTING DEVICE
Filed April 18, 1934
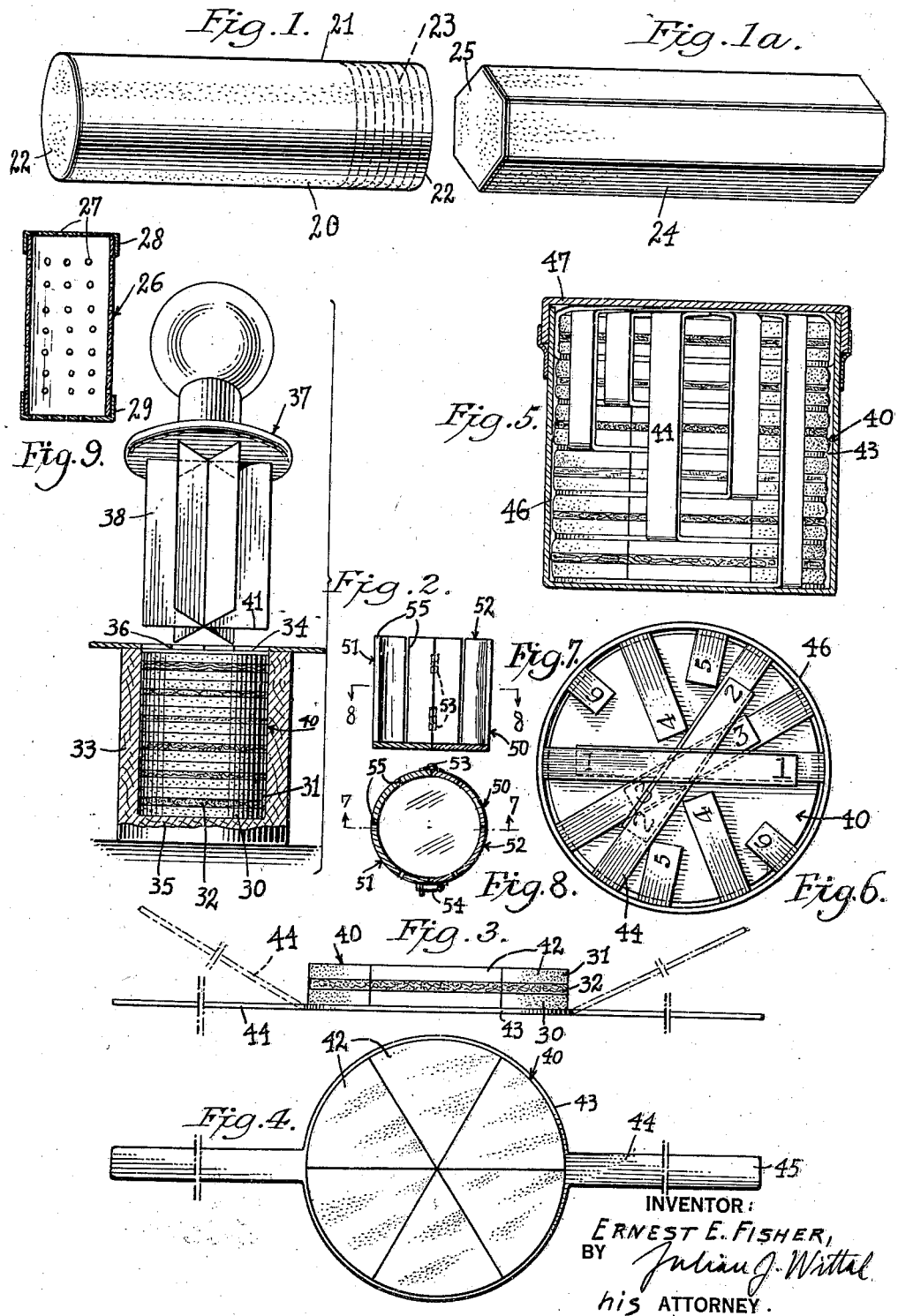
INVENTOR:
ERNEST E. FISHER,
BY Julian J. Wittal
his ATTORNEY.

Patented Mar. 22, 1938

2,111,910

UNITED STATES PATENT OFFICE 2,111,910

SANDWICH CUTTING DEVICE

Ernest E. Fisher, New York, N. Y., assignor to National Maté Corporation, New York, N. Y., a corporation of New York Application April 18, 1934, Serial No. 721,973

1 Claim. (Cl. 146—203)

This invention relates to a novel shape and construction of bread, in other words, loaves of bread, which will lead to improved quality of the bread and will also adapt the same for easier handling, either manually or in appropriate devices, tools and machines, and which will make it possible to cut entirely identical, uniform slices of such bread with simple, efficient and quick means and which will also facilitate the packing and shipping of such breads.

Another object of this invention is to provide a novel method and novel means for preparing sandwiches from such bread and for the storing, packing and shipping of them.

Other objects of this invention will be apparent as the specification of the same proceeds.

In the drawing, forming a part of this application for Letters Patent, and accompanying the same:—

Fig. 1 is a perspective view of a loaf of my bread showing a cylindrical shape, while Fig. 1a is a similar view thereof showing a regular hexagonal prismatic shape for the same.

Fig. 2 is a perspective and partly sectional elevation of a device used in cutting sandwiches produced by the use of my bread into sectional units in a quick and efficient manner and on a larger scale, one embodiment of the knife to be used for this operation being shown in the upper part of said figure.

Fig. 3 is a side elevation showing a supporting device for my novel saidwiches with a set of sandwiches thereon, and Fig. 4 is a plan view of the same;

Fig. 5 is a partly sectional side elevation of a storing and shipping container with a number of units of my novel sets of sandwiches packed therein, and Fig. 6 is a plan view thereof, the cover of the same having been removed;

Figs. 7 and 8 are sectional elevations, and a partly sectional plan view, respectively, of a modification of my device for cutting sandwiches, made from my bread, into smaller units, while Fig. 9 is a cross sectional view of one form of baking containers or shapes to be used in the manufacture of my novel bread.

Referring now to the drawing, in detail, by characters of reference, the numeral 20 indicates one form of my bread, shown in Fig. 1, being of a cylindrical, elongated shape with substantially circular cross sections all along its length. The bread will have a uniform crust on its outer or cylindrical surface 21 and on its left hand and right hand end surfaces 22. It is obvious that such a bread is very easily handled, stored, packed, shipped and it will be especially adapted for slicing the same, as indicated by the dotted lines 23, by hand or by any appropriate tools or machines, producing practically uniform, identical slices of bread.

In Fig. 1a, I show another modification 24 of my bread, having a hexagonal, elongated, prismatic shape, its end surfaces and cross sections 25 being substantially identical all along its length and showing a substantially regular hexagonal shape.

It will be obvious that other such prismatic rod-like loaves of bread may be produced with any desired regular polygonal cross-sections uniform all along their length, and, to my knowledge, no such loaves of breads have even been used, produced or described.

Any appropriate method may be used for the baking of such breads but I prefer to use a hollow shape or form, as indicated by the numeral 26 in Fig. 9, having thin, preferably metallic walls, and holes 27 therein, a removable top and bottom 28 and 29, respectively, will enable the operator to easily fill such form, and to easily remove the bread therefrom, when baked, said holes permitting the escape of initial gases, while the rising and baking dough later will close said holes.

My novel bread not only will be especially adapted to produce uniform slices thereof, but also sandwiches of any well-known combinations in large quantities and in uniform attractive and desirable shapes by efficient and quick methods. For this purpose, uniform slices are produced from my rod-like loaf of bread, as will be obvious and as has been indicated in Fig. 1, and sandwiches will be built from pairs 30 and 31 of such slices, an appropriate filling layer 32 being placed between them (Fig. 2). Said filling layer may consist of ham, cheese, raw vegetables, or any of the other well-known materials and foodstuffs used for such purposes. The sandwiches so produced will then be placed in a column, one on top of the other, into a hollow container 33, preferably having a circular cross-section identical with the cross-section of the bread when cylindrical breads are used or with the circle described around the polygonal cross-sectional figure of the prismatic bread, or said container 33 may also be of substantially identical regular polygonal cross-section to that of the bread used. Said container 33 will be open at the top, as at 34, but closed at the bottom, as at 35, and I prefer to make the same out of wood in one integral unit and to have slots or grooves 36 in its side walls corresponding to the number of sections into which each such layer of sandwich will be cut. An appropriate knife or tool 37 may be provided having radially projecting knives 38 fitting into said grooves or slots 36, and after the column 39 of the individual sandwiches, generally indicated by the numeral 40, have been built up to the top 34 of the container, said star-like radial group of knives 38 will be pressed downwardly to the bottom 35 thereof, the sharp bottom cutting edges 41 of the knives separating all the layers of sandwiches, that is, all the units 40 of the sandwiches into a number of identical uniform sections or sub-units 42. (Figs. 3 and 4.) This way, in a very quick manner, a great number of perfectly identical, uniform sandwiches may be produced, each having well-defined outer walls so that their handling, packing or consumption will be greatly facilitated, as will be obvious.

For one method of packing and shipping such sandwiches, I provide a circular supporting disc 43 of preferably inexpensive cardboard material, being in diameter identical or slightly larger than the sandwich 40 itself. Two, preferably oppositely placed, extensions or ears 44 may be provided with each such disc 43, preferably in one integral piece therewith, the end 45 of each ear or extension 44 may be left in the same shape as the body thereof, by simply terminating the extension there, or may be formed into an appropriate enlarged disc ear or ring (not shown) for a better grip thereof.

The discs 43 with the sectional cut sandwiches 40 thereon, (or uncut, if so desired) are now placed into a hollow container 46 (Fig. 5) of appropriate shape and size and the ears 44 are turned upwardly (Figs. 5 and 6) until the whole container is filled, when the ears are bent over on the top of the stack or column of sandwiches, as indicated in Fig. 6. A cover 47 may be provided for this container and the sandwiches shipped and kept stored in such containers, and when it is desired to use them, they may be lifted out, one after the other, by gripping the ears 44 of the respective sandwich. In Fig. 6, each pair of ears belonging to a respective disc 43 are marked with identical numbers, as 1—1; 2—2; etc., and instructions may be mailed with such a container disclosing what kind of sandwiches are stored on the discs marked 1—1; 2—2; etc.

In Figs. 7 and 8, I show a modified form for the container in which the sandwiches may be conveniently and quickly cut into sections. This modification comprises a hollow container 50 similar to the one shown in Fig. 2, but in this modification the hollow container is composed of two halves 51 and 52 connected by hinged means 53 so that they may be opened and closed, for an easier filling thereof and a quicker removal of the sandwiches therefrom. Any appropriate, releasable, locking means 54 may be employed to keep the two halves locked upon one another during the cutting operation. The side walls of each half 51 and 52 also will be provided with vertical slots 55 going through the material thereof and reaching to the bottom of the container. These slots 55 are arranged diagonally opposite one another, in the two halves and of equal distance from one another, so that a knife or other cutting tool may be passed through two diagonally opposite such slots and the sandwiches stacked in the device may be cut in a quick and efficient manner into identical sections, as has been described hereinbefore.

It is also obvious that such a hollow container may be used for packing and shipping sandwiches, instead of the container 46 shown in Fig. 5, in which case, of course, the slots 55 may be omitted therefrom and the same may be provided with any appropriate closing top, as indicated by the numeral 47 in Fig. 5, and in which case, the lifting extensions 44 may be omitted from the stack of the sandwiches and their supporting devices, since the sandwiches may be easily removed by opening the hinged container.

It will be understood that changes and variations may be made in the parts and combinations of my device and I hereby reserve all my rights to any and all such changes as are within the spirit of the invention and the scope of the appended claims.

It also will be understood that an important advantage of a loaf of bread made according to this invention will be that the length, width and height thereof, that is, its size, in proportion to a certain desired weight of bread, like one pound, two pounds, etc. can be prearranged before baking the same and shapes made according to a predetermined plan for the baking of the loaves. In this manner, slices of bread of desired size and number can be produced with great facility and avoiding of waste.

What I claim as new, is:—

A cutting device for sandwiches made of slices of a loaf of bread having substantially identical cross-section all along its length, comprising a hollow body open at the top adapted to receive a column of sandwiches placed therein, closely encircling the same, and a plurality of elongated knives sharpened at their lower edges and arranged in diameters of said body, their planes crossing one another at the center of the same and reaching into the sides thereof, said knives being equal in length to the inside length of said hollow body from top to bottom, diametrically opposed slots being provided through the wall of said hollow body to slidably receive the opposite outer edges of the respective knives, said hollow body being made of two halves hinged and releasably secured to one another in a longitudinal diametrical plane thereof, to facilitate the filling and emptying of the device, a disk from which said knives depend adapted to engage the top of said hollow body and limit the movement of said knives, and a handle knob secured on top of said disk.

ERNEST E. FISHER.